J. & A. Densmore.
Freight Car.
No. 2,261. Reissued May 29, 1866.
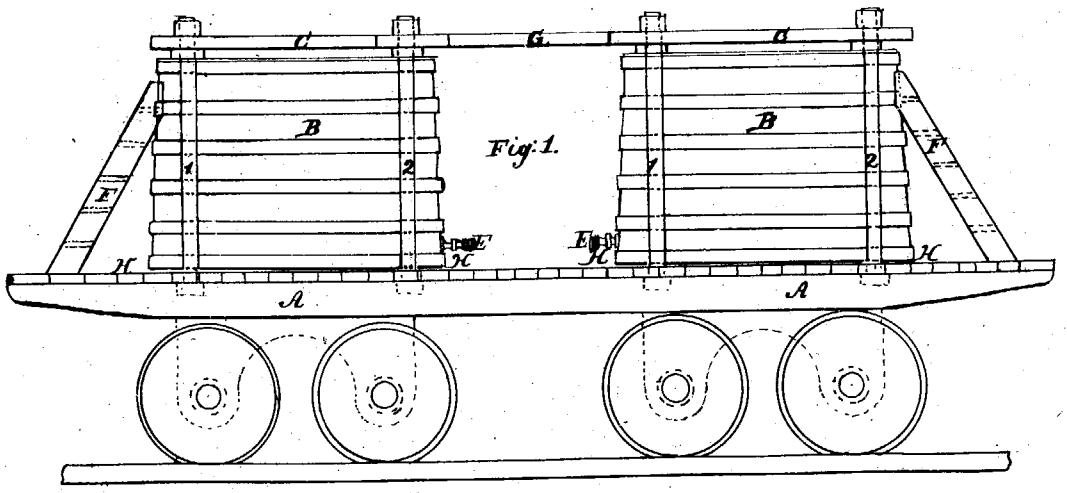
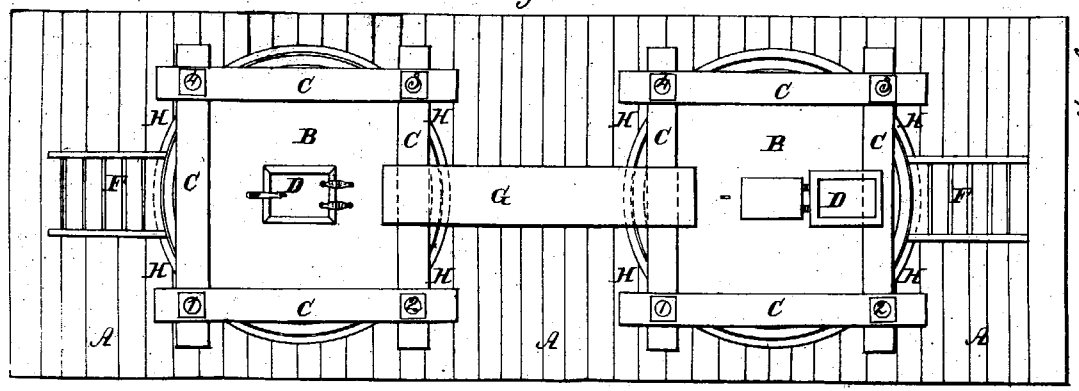
Witnesses
Geo. Lay Box
M. A. Blanchard
Inventor;
James Densmore
Amos Densmore

UNITED STATES PATENT OFFICE.

JAMES DENSMORE AND AMOS DENSMORE, OF MEADVILLE, PENNSYLVANIA.

IMPROVED CAR FOR TRANSPORTING PETROLEUM.

Specification forming part of Letters Patent No. 53,794, dated April 10, 1866. Reissue No. 2,261, dated May 29, 1866.

*To all whom it may concern:*

Be it known that we, JAMES DENSMORE and AMOS DENSMORE, of Meadville, Crawford county, Pennsylvania, have invented a new and Improved Oil-Tank Car, for carrying petroleum and other like liquid substances in bulk in tank on railway-cars; and the following full, clear, and exact description will show the construction and operation thereof.

On the accompanying drawings, Figure 1 is a side view, and Fig. 2 a top view, of our invention; and the letters marked thereon refer to and correspond with the same letters in the description.

On the platform of an ordinary railway-car, A A, erect two large, light, tight, firm, stout tanks, B B, of wood staves hooped or of sheet-iron riveted and calked, or of other material, and put each tank directly over one of the trucks, so that the strain of the weight of the load will be upon those parts of the car that are stronger and better able to bear it. On the top of each tank put a frame of four bars, C C C C. Through the corners of the frame, close to and outside of the tank, and down through the platform of the car, pass the bolts 1 2 3 4. On the ends of the bolts, above the frame and below the platform, put screws and nuts and washers, and fasten and press the tank down upon the car firmly by means of the frame and bolts and screws. Besides attaching and fastening the tank and car together, the frame and bolts will act as guys or braces and tend to prevent any shock or jar from the swaying of the car. Upon the platform, close to the outside and bottom of the tank, bolt the cleats or stops H H H H, to keep the tank firmly in its place and prevent any jar or moving from any sudden stopping or starting of the car. In the top head of each tank make a man-hole, through which to pour in the substance to be carried, also for a man to get into the tank for any purpose. Around the man-hole put a casing, and over the casing and man-hole put a man-head or cover, D, to prevent rain, snow, or anything from leaking or falling into the tank. At the bottom of each tank put in a faucet, E, by which to draw off the contents. Up the side of each tank, next the end of the car, put the steps F, to enable one to get on and off the tank readily; and across from one tank to the other put the runway G, to enable brakemen and others to pass over the cars with facility.

The nature of our invention consists in combining two large, light, tight, firm, stout tanks with an ordinary railway-car and making the tanks practically a part of the car, so as to carry the desired substance in bulk in the car itself, or in a permanent fixture and part thereof, instead of in barrels, casks, hogsheads, tierces, or other movable vessels or packages, as is now universally done on railway-cars, and thereby save carrying the weight of the barrels, casks, hogsheads, tierces, or other movable vessels or packages.

What we claim as our invention, and desire to secure by Letters Patent, is—

1. The two tanks B B, or their equivalent, when constructed and operating in combination with an ordinary railway-car, substantially as and for the purposes set forth.

2. The two tanks B B, or their equivalent, when set directly, or nearly so, over the car-trucks, and when constructed and operating in combination with an ordinary railway-car, substantially as and for the purposes set forth.

3. The frames C C C C, the bolts 1, 2, 3, and 4, and the cleats H H H H, when constructed and operating in combination with tanks B B and an ordinary railway-car, substantially as and for the purposes set forth.

4. The steps F F, the man-holes and man-heads D D, the faucets E E, and the runway G, when constructed and arranged in combination with tanks B B and an ordinary railway-car, substantially as herein set forth and described.

JAMES DENSMORE.
AMOS DENSMORE.

Witnesses:
C. M. BOUSH,
M. SCHMIDT.